A. LUST.
DISH OR PLATE.
APPLICATION FILED JULY 20, 1907.
922,495.
Patented May 25, 1909.
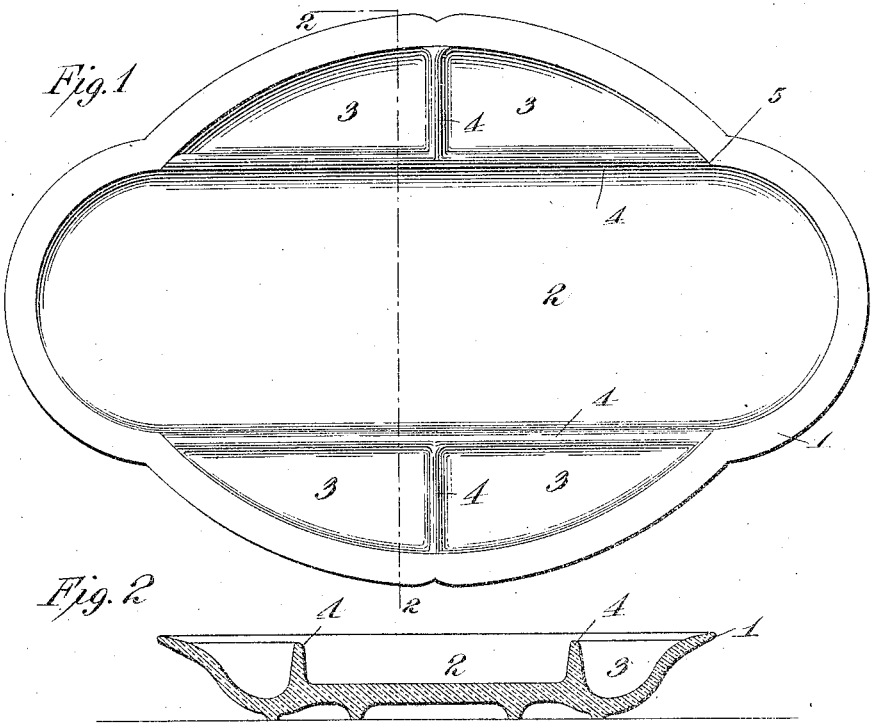

UNITED STATES PATENT OFFICE.

ALFRED LUST, OF NEW YORK, N. Y.

DISH OR PLATE.

No. 922,495.    Specification of Letters Patent.    Patented May 25, 1909.

Application filed July 20, 1907. Serial No. 384,751.

*To all whom it may concern:*

Be it known that I, ALFRED LUST, a citizen of the United States, and a resident of the borough of Manhattan, city, county, and State of New York, have invented an Improvement in Dishes or Plates, of which the following is a specification.

My invention relates to the production of a dish or plate for the service of food, by means of which there will be a great simplification of service and economizing of space, a reduction of cost and great facility in cleaning, and a saving in breakage.

By my invention I combine the functions of the plurality of dishes ordinarily employed for serving meat or fish and vegetables in a single structure. By so doing I simplify the service, as one dish may be filled and carried instead of a plurality of dishes heretofore found necessary. The economy of space is secured for the same reason, as is also the cheapness of construction, the facility in cleaning and the saving in breakage.

I attain the objects of my invention by the device illustrated in the accompanying drawings, in which—

Figure 1 is a plan view of a dish or plate embodying my invention. Fig. 2 is a section on the line 2—2 of Fig. 1.

In all of the views like parts are designated by the same reference characters.

In carrying out my invention I provide a dish or plate formed of crockery ware, porcelain, glass, metal or any other suitable material made in one piece or in a plurality of pieces.

As shown in the plan views, the plate is best made in the quatrefoil shape shown, and is provided with a raised rim 1. One large compartment 2 is provided for holding the meat or fish, and a plurality of smaller compartments 3—3 for holding vegetables, sauces, etc. The large compartment 2 preferably extends from end to end across the length of the dish, as shown, so that its length is equal to the longest dimension of the dish. The different compartments are formed by the partitions 4, which rise up from the bottom of the plate to a height approaching the height of the rim 1. In Fig. 1 these partitions are shown connecting two of the cusps 5 on each side of the plate. A shorter partition divides the arc on each side of the dish in two small compartments, so that four small and one large compartment are provided. The bottom of the large compartment 2 is best raised as shown in Fig. 2, so that the contents of the compartment are rendered more accessible. The bottom of the small compartments 3 are best depressed as shown in Fig. 2, so that the capacity of such compartments is increased. The elevation of the bottom of the compartment 2 is desirable, as the contents have to be carved or otherwise manipulated, which will render the compartment of the full depth less handy. The smaller compartments containing vegetables or sauces require no such manipulation, and therefore may be of the full depth, resulting in increased capacity.

By employing the foliated shape, sharp corners with consequent breakage is reduced. The sides of the partitions 4 are preferably inclined, as shown in Figs. 2 and 4, so that sharp corners in the compartments are avoided and cleansing is rendered easy. For the same reason the sides 1 are inclined toward the center, and the bottoms of the small compartments 3—3 incline outward toward the rim.

Another advantage in making the smaller compartments 3 of greater depth than the larger compartment 2 is that by such greater depth the surface exposed to the air is reduced, therefore the contents of the smaller compartments may be kept warmer than if they were the same depth as the larger compartment.

In accordance with the provisions of the patent statutes, I have described the principle of my invention, together with the apparatus which I now consider to represent the best embodiment thereof.

Having now described my invention, what I claim as new and desire to secure by Letters Patent, is—

1. A dish of the shape of a quatrefoil of greater length than breadth and with a raised rim and straight dividing partitions, such partitions being parallel and extending lengthwise the dish, each partition joining two opposite cusps, and a partition perpendicular to and connecting a longitudinal partition and the rim of the dish.

2. A dish of the shape of a quatrefoil of greater length than breadth and with a raised rim and straight dividing partitions, two of such partitions being parallel and extending lengthwise the dish, each joining two opposite cusps, and cross partitions connecting the longitudinal partitions with the rim, leaving the center of the dish undivided.

3. A dish of the shape of a quatre-foil, with a raised rim and straight dividing partitions, such straight dividing partitions being parallel, each partition joining two opposite cusps.

This specification signed and witnessed this 19th day of July, 1907.

ALFRED LUST.

Witnesses:
LEONARD H. DYER,
JOHN L. LOTSCH.